(12) United States Patent
Del Rosario et al.

(10) Patent No.: US 12,262,344 B2
(45) Date of Patent: Mar. 25, 2025

(54) METHOD AND ARTICLE OF MANUFACTURE FOR PROVIDING A MOBILITY MANAGEMENT WITH OPTIMIZED PAGING

(71) Applicant: SAMSUNG ELECTRONICS CO., LTD., Suwon-si (KR)

(72) Inventors: Luis Gabriel Quiambao Del Rosario, Quezon (PH); Amielle Barrion Dulay, Sta. Rosa (PH); Williard Joshua Decena Jose, Quezon (PH); John William Fuertes Orillo, Imus (PH); Joseph Alan Paraiso Baking, Quezon (PH)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/850,886

(22) Filed: Jun. 27, 2022

(65) Prior Publication Data

US 2023/0114869 A1 Apr. 13, 2023

Related U.S. Application Data

(63) Continuation of application No. PCT/KR2022/008164, filed on Jun. 9, 2022.

(30) Foreign Application Priority Data

Oct. 12, 2021 (PH) .......................... 1-2021-050520

(51) Int. Cl.
*H04W 56/00* (2009.01)
*H04W 60/04* (2009.01)
*H04W 68/00* (2009.01)

(52) U.S. Cl.
CPC ......... *H04W 60/04* (2013.01); *H04W 68/005* (2013.01)

(58) Field of Classification Search
CPC .......................... H04W 60/04; H04W 68/005
(Continued)

(56) References Cited

U.S. PATENT DOCUMENTS 8,254,924 B2 8/2012 Prakash et al.
8,428,029 B2 4/2013 Fox et al.
(Continued)

FOREIGN PATENT DOCUMENTS

| JP | 2020-145755 | 9/2020 |
| WO | 2012/171574 | 12/2012 |
| WO | 2017/085106 | 5/2017 |

OTHER PUBLICATIONS

"Du, Paging Method Of 5 G Network, Device, Storage Medium And Core Network, Oct. 19, 2021, CN 11358427" (Year: 2021).*
(Continued)

*Primary Examiner* — Sai Ming Chan
(74) *Attorney, Agent, or Firm* — Nixon & Vanderhye P.C.

(57) ABSTRACT

Implementations for providing a mobility management with optimized paging system in a wireless communication system comprising a core network (CN) node and a user equipment (UE) in operative communication with one another through a base station are disclosed. The paging system may, by way of example, be provided in three stages. The first stage is determining whether the destination base station is the same as the source base station, resulting in either first paging if they are the same or to subjecting the base stations belonging to the tracking area list where the UE is found to filtering if they are not the same. The second paging takes place if the destination base station is present in a list of predicted base stations that come as a result of the (Continued)

filtered base stations. The third paging may take place if the destination base stations is not present in the list of predicted base stations.

15 Claims, 14 Drawing Sheets

(58) Field of Classification Search
USPC .......................................................... 370/329
See application file for complete search history.

(56) References Cited

U.S. PATENT DOCUMENTS

| | | |
|---|---|---|
| 8,903,432 B2 | 12/2014 | Yang |
| 9,332,498 B2 | 5/2016 | Nylander et al. |
| 10,231,213 B2 | 3/2019 | Reial et al. |
| 10,660,000 B2 | 5/2020 | Bachmann et al. |
| 11,178,583 B2 | 11/2021 | Li et al. |
| 2010/0240400 A1 | 9/2010 | Choi |
| 2011/0105155 A1 | 5/2011 | Bienas et al. |
| 2014/0106790 A1 | 4/2014 | Kakinada et al. |
| 2015/0036663 A1 | 2/2015 | Kilpatrick, II et al. |
| 2015/0038180 A1 | 2/2015 | Quick, Jr. et al. |
| 2018/0132096 A1* | 5/2018 | Huo .................. H04W 8/08 |
| 2020/0296569 A1 | 9/2020 | Kumar et al. |
| 2021/0029760 A1 | 1/2021 | Shu et al. |
| 2021/0212013 A1 | 7/2021 | Chen et al. |

OTHER PUBLICATIONS

"Bangolae, Ran-Based Paging Optimizations, Feb. 15, 2018, WO 2018031802" (Year: 2017).*
Formality Examination Report dated May 13, 2022 issued in PH Patent Application No. 1-2021-050520.
"3GPP; TSG SA; Procedures for the 5G System (5GS); Stage 2 (Release 17)", 3GPP TS 23.502 V17.2.1, Sep. 29, 2021, 714 pages.
Search Report and Written Opinion dated Sep. 6, 2022 issued in International Patent Application No. PCT/KR2022/008164.

* cited by examiner

METHOD AND ARTICLE OF MANUFACTURE FOR PROVIDING A MOBILITY MANAGEMENT WITH OPTIMIZED PAGING

CROSS-REFERENCE TO RELATED APPLICATIONS

This application is a continuation of International Application No. PCT/KR2022/008164 designating the United States, filed on Jun. 9, 2022, in the Korean Intellectual Property Receiving Office and claiming priority to Philippine Patent Application No. 1-2021-050520, filed on Oct. 12, 2021, in the Philippine Patent Office, the disclosures of which are incorporated by reference herein in their entireties.

BACKGROUND

Field

The disclosure relates to technical implementations for wireless communication systems and, for example, to a method, a system, a mobile communications network, and an article of manufacture for providing a core network-initiated mobility management with optimized paging system in a wireless communication system.

Description of Related Art

Modern telecommunication networks require knowledge on the location of a User Equipment (UE) in order for respective Base Stations (BS) to be able to provide services. This is done through the Tracking Area Update (TAU) or Paging procedures for the purpose of location registration, which are both managed by the Mobility Management Entity (MME) for 4G networks, or the Access and Mobility Management Function (AMF) for 5G networks. It was found that approximately 29% of the signal load across MME systems are taken up by these paging events. As telecommunication networks transition into more advanced and complex systems, smaller service cells due to higher frequency bands would lead to a significant increase in paging messages and unnecessary overhead in systems.

Currently, and for a long time now, there is no existing system directly integrated with the telecom core network that optimizes paging messages based on learning from actual UE mobility data in the network. An optimized paging system would lead to less message overhead caused by paging in the overall signal load of mobility management systems.

SUMMARY

Embodiments of the disclosure provide a method of providing a mobility management with optimized paging system in a wireless communication system comprising a core network (CN) node and a user equipment (UE) in operative communication with one another through a base station, wherein the CN node is adapted for management of at least connection and mobility of the UE, wherein the UE is configured to send periodic location registrations to the CN node, and wherein a first periodic location registration of the periodic location registrations identifies a first set of tracking areas for the UE.

According to an example embodiment, a method for providing mobility management is provided, the method comprising: transceiving, by a first base station of the user equipment (UE) located in the first set of tracking areas with which the UE is registered, an indication for a transmission of a first paging message with a core network (CN) node, wherein the CN node is connected to a paging server comprising part of the wireless communication system, wherein the CN node and the paging server are configured to exchange paging information with one another, and wherein the first paging message is transmitted from the base station to the UE while the connection associated with the UE is in operative state between the base station and the CN node.

The method may further comprise: notifying, by the UE via a second periodic location registration of the periodic location registrations, the CN node of a second set of tracking areas when the UE moves outside the first set of tracking areas, wherein the CN node communicates the second set of tracking areas with the paging server.

The method may further comprise: generating, by the paging server, a mobility model indicative of the mobility of the UE, based at least in part on the first and second sets of tracking areas and the paging information, wherein the mobility model includes indications of one or more second base stations, from which an actual, serving, or destination base station may be determined, associated with the second set of tracking areas.

The method may further comprise: filtering, by the paging server, the one or more second base stations associated with the second set of tracking areas based at least in part on the mobility model, wherein the filtered one or more second base stations are included in a subset of the second set of tracking areas, and wherein the subset of the second set of tracking areas that includes the filtered one or more second base stations is transmitted from the paging server to the CN node.

The method may further comprise: receiving, by each filtered second base station of the filtered one or more second base stations, an indication for a transmission of second paging message from the CN node, wherein the second paging message is transmitted from the each filtered second base station to the UE while the connection associated with the UE is in operative state between the each filtered second base station and the CN node, and wherein a serving filtered second base station is determined from any one of the one or more filtered second base stations for establishing the connection to the moving UE thereby providing the UE with telecommunication services designed for the wireless communication system.

The method may further comprise: receiving, by all the second base stations associated with the second set of tracking areas, an indication for a transmission of third paging message from the CN node when no serving filtered base station is determined in the previous step, wherein the third paging message is transmitted from the all the second base stations to the UE while the connection associated with the UE is in operative state between the each of the all the second base stations and the CN node, and wherein a further serving second base station is determined from any one of the all the second base stations for establishing the connection to the moving UE thereby providing the UE with the telecommunication services.

According to an example embodiment, provision of three-stage paging implemented with one or more mobility models and one or more filtering and optimization algorithm ensures that the overhead paging traffic consumed is reduced, which in turn increases network capacity and promotes efficient use of network resources ultimately leading to lower costs.

For a better understanding of the disclosure and to illustrate how the same may be performed in various ways, various example embodiments and/or implementations thereof will now be described, by way of non-limiting examples only, with reference to the accompanying drawings.

In accordance with an example embodiment of the disclosure, a method of Access and Mobility management Function (AMF) for mobility management is provided. The method comprises: obtaining, from a User Equipment (UE), information related to a first set Tracking Area List (TAL), obtaining, from the UE, information related to a second set TAL as the UE moves from a TA in the first set TAL to a TA in the second set TAL, obtaining an optimized paging list, by applying information related to at least one of the first set TAL and the second set TAL to at least one learning model generated based at least on the information related to the first set TAL and information related to the second set TAL, transmitting information instructing transmission of a paging message to at least one base station to which the UE is predicted to be connected, based on the obtained optimizing paging list, wherein the first set TAL includes a TA in which the UE is located before the UE transitions to an idle state.

In accordance with an example embodiment, Access and Mobility management Function (AMF) for mobility management is provided. The AMF comprises: a memory configured to store at least one or more instructions and at least one a processor configured to execute the at least one or more instructions stored in the memory. The processor is configured to: obtain, from User Equipment (UE), information related to a first set Tracking Area List (TAL), obtain, from the UE, information related to a second set TAL, as the UE moves from a TA in the first set TAL to a TA in the second set TAL, obtain an optimized paging list by applying information related to at least one of the first set TAL and the second set TAL to at least one learning model generated based at least on the information related to the first set TAL and information related to the second set TAL and transmitting information instructing transmission of a paging message to at least one base station to which the UE is predicted to be connected based on the obtained optimized paging list, wherein the first set TAL includes a TA in which the UE is located before the UE transitions to an idle state.

According to an example embodiment, one or more computer-readable mediums embodying instructions that cause on or more processors to perform the various methods above may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
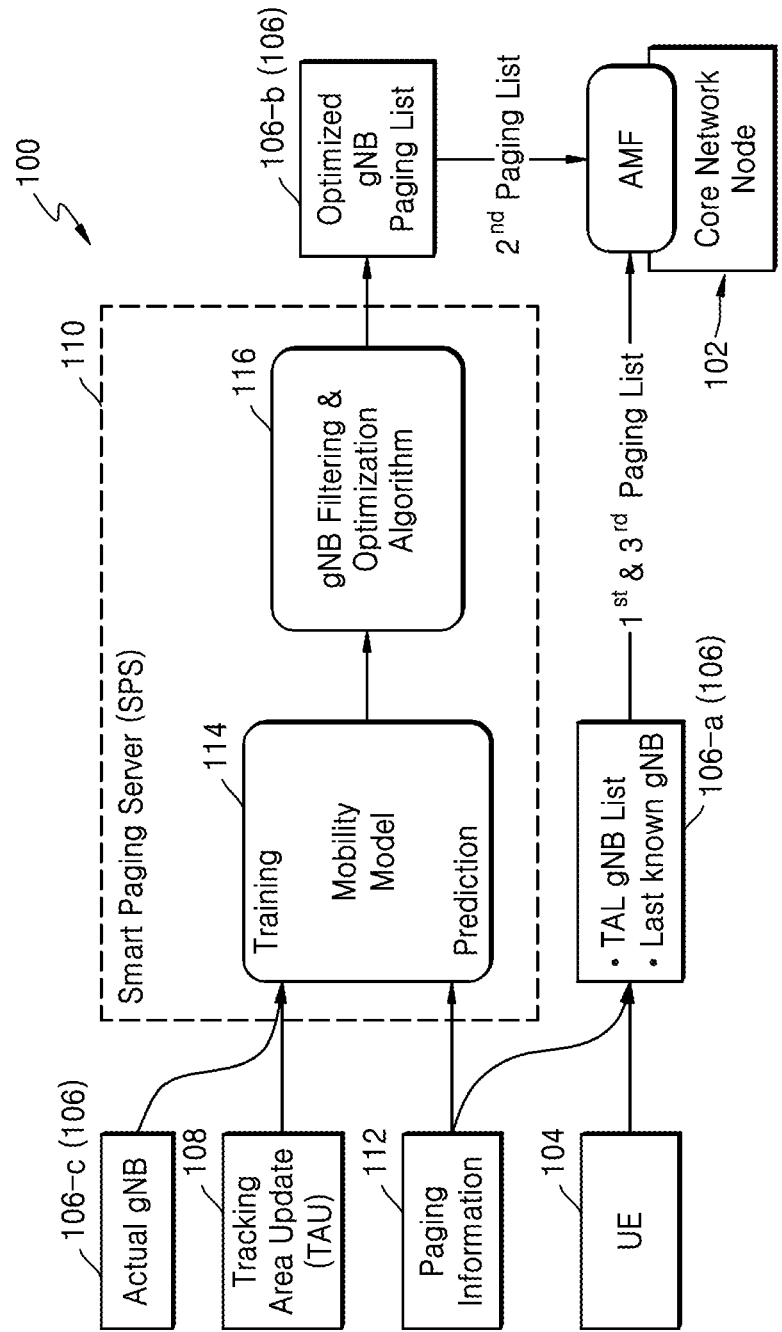
FIG. 1 is a block diagram illustrating an example wireless communication system according to various embodiments.

The disclosures and illustrations of the various example embodiments of one or more aspects of the present disclosure, along with one or more components, features or elements thereof, are merely representative for the purpose of sufficiently describing the manner by which the present disclosure may be carried out into practice in various ways other than the ones outlined in the ensuing enabling description of the present disclosure.

It is to be understood and appreciated, however, that the various example embodiments used to describe how to make and use one or more aspects of the present disclosure may be embodied in many alternative forms and should not be construed as limiting the scope of the appended claims in any manner, absent express recitation of those features in the appended claims. All the example drawings, diagrams, tables, formula, and illustrations accompanying the ensuing description should also not be construed as limiting the scope of the appended claims, as accompanied by this description, in any manner.

Unless the context clearly and explicitly indicates otherwise, it is also to be understood that like reference numerals refer to like elements throughout the ensuing description of the figures and/or drawings of the present disclosure, that the linking term "and/or" includes any and all combinations of one or more of the associated listed items, that the singular terms "a", "an" and "the" are intended to also include the plural forms, and that some varying terminologies of the same meaning and objective may be interchangeably used throughout the ensuing enabling disclosure.

As may be used herein, unless otherwise specified, and consistent with one or more aspects and/or one or more implementations of the present disclosure, the term "include", "consist" or "have" may refer to the corresponding component that can be inherent to exclude other components. All terms, including technical or scientific terms, have the same meaning as generally understood by a person skilled in the art to which the present disclosure belongs, unless otherwise defined. Commonly used terms, such as herein predefined terms, should be interpreted as being consistent with the meaning of the context of the related art, and are not to be interpreted as ideal or excessively formal meanings unless explicitly defined in the present disclosure.

It is also to be understood and appreciated that, in any portion or portions of the herein disclosure, the use of ordinal terms such as "first," "second," "third," and so forth, is used herein to distinguish elements, features, components, calculations or steps from one another and should not also be construed as limiting the scope of the appended claims, and that these and such other ordinal terms that may appear in the ensuing description of the one or more aspects of the present disclosure are not indicative of any particular order of elements, features, calculations, components or steps to which they are attached. For example, a first element could be termed a second element or a third element. Similarly, a second element could be termed a first element or a third element. All these do not depart from the scope of the herein disclosure and its accompanying claims.

As may be used herein, unless otherwise specified, and consistent with one or more aspects and/or one or more implementations of the present disclosure, the term "system" may refer to the hardware and software environment in which application programs operate. The system is thus defined by the combined effect of native operating hardware and software and any other operating environment. The operating environment may be a software layer existing between any native operating hardware and any framework. Still, such a layer may not exist or may be different.

As may be used herein, and consistent with one or more implementations of the present disclosure, the terms "computer-implemented method" may refer to the method that may be carried out in a computer or computing system, e.g., a computer program executed by a CPU. A computer, as used herein, refers to a computing device that can be programmed to perform a set of arithmetic or logical operations automatically. Computers or computing systems, as used herein, may include, personal computers, workstations, servers, mainframes and supercomputers. The computers or computing systems can be a stand-alone system, networked system or a virtual machine residing in a computing network and/or a mobile network.

As may be used herein, and consistent with one or more implementations of the present disclosure, the term "processor" may refer to a central processing unit or "CPU" which is a computing device that can read a computer-executable program from a computer memory (e.g., ROM or other computer memory) and perform a set of steps according to the computer-executable program. The terms "computer readable medium" in totality may refer to any device or system for storing and providing information to a computer processor, examples of which may include drives and servers, by way of examples, for exchanging packets over mobile communication networks.

As may be used herein, and consistent with one or more implementations of the present disclosure, the terms "core network" may refer to a network for facilitating radio access based on mobile communication standards, and may include a network control node such as in the form of, by way of example and not by way of limitation, the Mobility Management Entity (MME) for 4G networks, the Access and Mobility Management Function (AMF) for 5G networks, or any comparative structure for future generations of networks. The MME or AMF is responsible for the back-and-forth movements of data packets to and from the mobile communication devices within its geographical service area, and which in most cases is provided with packet routing/transfer functions, mobility management or tracking area management function, session management function, user plane function, logical link management function, network slice function, policy control function, and authentication function.

As may be used herein, and consistent with one or more implementations of the present disclosure, the terms "user equipment (UE)" may refer to a portable computing device, a mobile computing device, a smartphone, or a user terminal, any of which may be characterized by a wireless communication device that may suitably operate with or without a SIM or subscriber identification module, and that may include a set and/or a combination of hardware and software modules which are generally arranged to enable operative connection with a radio network node via a predetermined connection, and particularly arranged to enable operative connection with a base station in order to send and receive signals to and from the base station.

As may be used herein, and consistent with one or more implementations of the present disclosure, the terms "base station" may refer to the hardware with which mobile stations communicate, wherein the hardware can be implemented as a radio transceiver station, a cellular or cell tower, or the like, that is configured to transfer information to a subscriber UE, mobile phone, smart-phone, user terminal, or the like, within a specific radio coverage area using a mobile communications switching center based on licensed cellular frequencies and wireless communication standards.

As may be used herein, and consistent with one or more implementations of the present disclosure, the term "node" may refer to any equipment that is adapted, configured, arranged, and/or operably designed to communicate directly, or even indirectly in some scenarios, with one or more wireless communication devices and/or with other network side nodes or equipment in the wireless communication network to enable and/or provide wireless access to the wireless communication device and/or to perform various functions in the wireless communication network through the use of processing circuitries and radio circuitries.

An embodiment of the disclosure may be directed to a method of providing a core network-initiated mobility management with optimized paging system in a wireless communication system 100. The wireless communication system 100, as shown example block diagram of FIG. 1, comprises a core network (CN) node 102 and a user equipment (UE) 104 in operative communication with one another through a base station 106, which may be a last known or source base station (gNB) 106-a that belongs to a tracking area list (TAL), one or more filtered base stations 106-b, or an actual or destination base station (gNB) 106-c.

The CN node 102 is also referred to in the drawing as AMF which stands for Access and Mobility Management Function, both of which may be interchangeably used hereinafter throughout the present disclosure. As known in the relevant art to which the present disclosure belongs, and without prejudice to the present disclosure, the CN node 102 may be adapted for management of at least connection and mobility of the UE 104.

The UE 104 is configured to send periodic location registrations 108 to the CN node 102, wherein a first periodic location registration of the periodic location registrations 108 identifies a first set of tracking areas for the UE 104. In accordance with one or more implementations pf the present disclosure, and consistent with one or more aspects thereof, the periodic location registrations 108, which include the first periodic location registration, may be fulfilled by, and/or may refer to, a tracking area update (TAU) which may be managed by the Mobility Management Entity (MME) for 4G networks, or the Access and Mobility Management Function (AMF) for 5G networks. Accordingly, the periodic location registrations 108 is referred to in the drawings as TAU, both of which may be interchangeably used hereinafter throughout the present disclosure for the present disclosure.

The CN node 102 may refer to the AMF for 5G networks or, in an alternative implementation as may be the example arrangement, to MME for 4G networks. Depending on the network type and/or generation as the case may be, it is to be understood and appreciated that the periodic location registrations 108 may be fulfilled by a Routing Area Update (RAU), a combination of TAU and RAU, a Location Updating (LU), or other similar and comparative mechanism resulting from any tracking, updating, and/or paging procedures, depending on the state of the art at present, from the past, and/or at any point in the future as communication technologies improve. By way of example, without limitation and with greater clarity, the illustrated periodic location registrations 108 in the diagram of FIG. 1 are TAU.

The method of the present disclosure may be characterized by transceiving, by a first base station 106-a of the UE 104 located in the first set of tracking areas with which the UE 104 is registered and/or subscribed, an indication for a transmission of a first paging message with the CN node 102. The CN node 102 may be connected to a paging server 110, referred to in the accompanying drawings as smart paging server (SPS) 110, that forms part of the wireless communication system 100.

The CN node 102 and the paging server 110 may be arranged such that they exchange paging information 112 with one another. The paging server 110 may be a separate component from, or may be made as an integral part of, any one or more components of the CN node or AMF 102.

The first paging message is transmitted from the base station 106-a to the UE 104 while the connection associated with the UE 104 is in operative state between the base station 106-a and the CN node 102 in the system 100.

The method of the present disclosure may include notifying, by the UE 104 via a second periodic location registration of the periodic location registrations 108, the CN node 102 of a second set of tracking areas when the UE 104 moves outside the first set of tracking areas, wherein the CN node 102 communicates the second set of tracking areas with the paging server 110. The communication of the second set of tracking areas between the CN node 102 and the paging server 110 may be accomplished either in a wired or wireless manner.

The paging server 110 is referred to as smart paging server or "SPS" owing to its nature, in accordance with the present disclosure and consistent with one or more implementations thereof, of having training and prediction capacities from a mobility model 114, and further of having filtering and optimization processes 116, as may be disclosed herein, according to the present disclosure.

The method of the present disclosure may include generating, by the paging server 110, the mobility model 114 indicative of the mobility of the UE 104, based at least in part on the first and second sets of tracking areas and the paging information 112, wherein the mobility model 114 includes indications of second base stations 106-b associated with the second set of tracking areas, consistent with the present disclosure.

Training the learning model is prior to predictions about the gNB that will associated with the UE. Query tasks may be performed by the filtering and optimization processes 116 to reevaluate the trained and predicted base station related data from the mobility model 114 and to consequently determine if there is any serving or actual base station 106-c for the UE 104 from the second base stations 106-b. The SPS 110 may cause the processing to return to a task for a subsequent prediction to attempt a successive determination of the second base stations 106-b by the filtering and optimization processes or algorithms 116 in case the second base stations 106-b are not successfully established in a previous attempt. Such prediction may be performed in an iterative manner, and processing for the determination of the second base stations 106-b may continue indefinitely, or based on a predetermined number of attempts as the case may be, until the second base stations 106-b are successfully determined. In implementations, the SPS 110 may be configured to employ routine tasks in this regard, consistent with any predetermined timeout, predetermined number of attempts, or on reconfigurable re-initiation of training and/or prediction tasks.

The method of the present disclosure may include filtering, by the paging server 110, the second base stations 106-b associated with the second set of tracking areas based on the mobility model 114, wherein the filtered second base station or base stations 106-b are included in a subset of the second set of tracking areas, and wherein, without limiting the scope of the present disclosure, the subset of the second set of tracking areas that includes the filtered second base stations 106-b is accordingly transmitted from the paging server 110 to the CN node 102.

The method of the present disclosure may include receiving, by each filtered second base station 106-b of the filtered one or more second base stations 106-b, an indication for a transmission of second paging message from the CN node 102, wherein the second paging message is transmitted from each filtered second base station 106-b to the UE 104 while the connection associated with the UE 104 is in operative state between the each filtered second base station 106-b and the CN node 102, and wherein a serving or actual filtered second base station 106-c is determined from any one of the one or more filtered second base stations 106-b for establishing the connection to the moving UE 104 thereby providing the UE 104 with telecommunication services designed for the wireless communication system 100.

The method of the present disclosure may include receiving, by all the second base stations 106-b associated with the second set of tracking areas, an indication for a transmission of third paging message from the CN node 102 when no serving or actual filtered base station 106-c is determined in the previous step, e.g., the step of receiving an indication for a transmission of second paging message from the CN node 102 by the each filtered second base station 106-b of the filtered one or more second base stations 106-b. Here, the third paging message may be transmitted from all of the second base stations 106-b to the UE 104 while the connection associated with the UE 104 is in operative state between each of the all the second base stations 106-b and the CN node 102, and a serving or actual second base station 106-b is determined from any one of the all the second base stations 106-b for establishing the connection to the moving UE 104 thereby providing the UE 104 with the telecommunication services in the wireless communication system 100, as may be described in the ensuing disclosure for the present disclosure.

Figure 2:
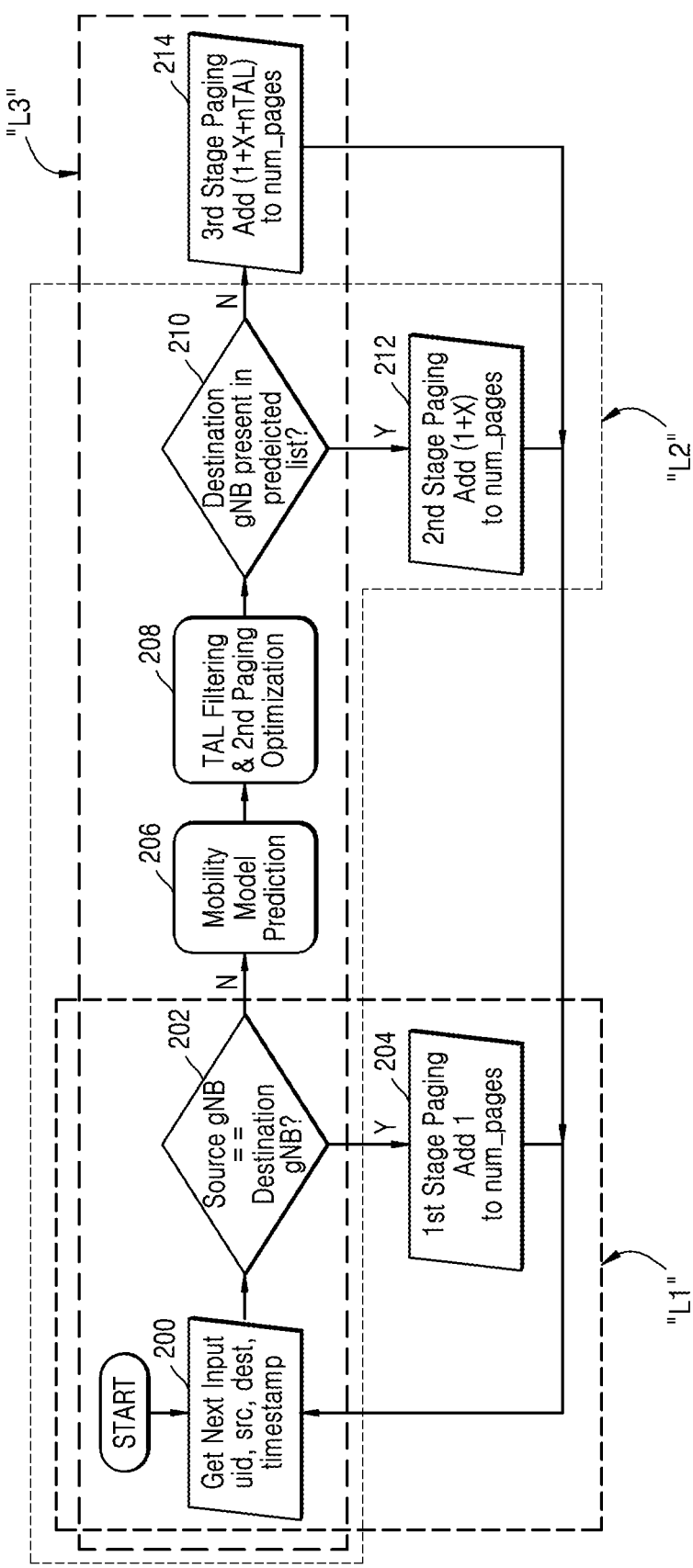
FIG. 2 is a flow diagram illustrating example three-stage paging employed according to various embodiments.

Referring now to FIG. 2, there is illustrated a flow diagram illustrating an example of the three-stage paging employed for the present disclosure, according to various embodiments, as may be disclosed herein, and described in relation to the wireless communication system 100 of FIG.

1. The disclosed first paging message is part of the first stage paging of the illustrated three-stage paging. The disclosed second paging message is part of the second stage paging of the illustrated three-stage paging. The disclosed third paging message is part of the third stage paging of the illustrated three-stage paging.

The loop "L1" is an example of the first stage paging for transmission of the first paging message, which commences at receiving and processing the input location registration data, desirably transmitted from the UE 104 to the core network node 102, as shown in block 200. The location registration data may include, by way of examples, and not by way of limitation, and consistent with one or herein disclosed implementations of the present disclosure, a user identification (uid) data, source base station (src) data, destination base station (dest) data, and timestamp data indicative of the transmission of each location registration.

At decision block 202, the source base station 106-a is compared with the destination base station 106-b, consistent with the herein disclosed method-step of notifying the CN node 102 of the second set of tracking areas associated with the destination base station 106-b by the UE 104 via the second periodic location registration of the periodic location registrations 108 when the UE 104 moves outside the first set of tracking areas associated with the source base station 106-a, wherein the CN node 102 operably communicates with the paging server 110 the second set of tracking areas associated with the destination base station 106-b.

As long as the first set of tracking areas associated with the source base station 106-a is the same as the second set of tracking areas associated with the destination base station 106-b, first stage paging for the transmission of the first paging message operates as shown in block 204. The first loop "L1" continues to execute as a routine task while there is no change between the first and second sets of tracking areas which in turn indicates that the UE 104 is not moving outside the present geographical service area or network in which it is operating in the mobile network.

Once the first loop "L1" is broken or terminated, e.g., the first set of tracking areas associated with the source base station 106-a is determined to be no longer the same as the second set of tracking areas associated with the destination base station 106-b, which in turn indicates that the UE 104 moves outside the first set of tracking areas and in a direction defined by the second set of tracking areas, the flow advances to block 206 wherein the mobility model 114 and the filtering and optimization process 116, as clearly illustrated in the diagram of FIG. 1, are instantiated by the paging server 110, as shown in blocks 206 and 208, respectively.

Referring to FIG. 2, the block 206 is consistent with the herein disclosed method-step of generating the mobility model 114 that is indicative of the mobility of the UE 104 based at least in part on the first and second sets of tracking areas and the paging information by the paging server 110, wherein the mobility model 114 includes information and indications of one or more second base stations 106-b associated with the second set of tracking areas.

In FIG. 2, the block 208 is consistent with the herein disclosed method-step of filtering the one or more second base stations 106-b associated with the second set of tracking areas based at least in part on the mobility model 114 by the paging server 110, wherein the filtered one or more second base stations 106-b are included in a subset of the second set of tracking areas, and wherein the subset of the second set of tracking areas that includes the filtered one or more second base stations 106-b is transmitted from the paging server 110 to the CN node 104.

At decision block 210, it is determined whether any serving second base station 106-b is present in the filtered one or more second base stations 106-b which may come in a form of predicted list, consistent with the herein disclosed method-step of receiving the indication for the transmission of second paging message from the CN node 102 by each filtered second base station 106-b of the filtered one or more second base stations 106-b, which may be performed through the second stage paging 212. Here, the second paging message may be transmitted from the each filtered second base station 106-b to the UE 104, and the serving filtered second base station 106-c is determined from any one of the filtered second base stations 106-b for establishing the connection to the moving UE 104.

For each instance where the serving second base station 106-b is determined to be present in the filtered second base stations 106-b, the second stage paging for the transmission of the second paging message operates as shown in block 212, and all resulting data forms part of the input data shown in the first illustrated block 200, forming the second loop "L2." The second loop "L2" continues to execute as a routine task for each instance where the serving second base station 106-b is determined to be present in the filtered second base stations 106-b, which may refer, for example, to there being no need to proceed with the third stage paging for the transmission of the third paging message. This, in turn, guarantees that the entire paging system leads to less message overhead caused by paging in the overall signal load of mobility management system. As a result, the herein disclosed paging system, consistent with one or more implementations of the present disclosure, is optimized.

However, if at any instance that no serving second base station 106-c is determined to be present in the filtered one or more second base stations 106-b in the decision block 210, and as a backup, the third stage paging for the transmission of the third paging message may be started, as shown in the final block 214, creating loop "L3." This is consistent with the herein disclosed method-step of receiving the indication for the transmission of third paging message from the CN node 102 when no serving filtered second base station 106-c is determined, wherein the third paging message is transmitted from the all the second base stations 106-b to the UE 104, and wherein a further serving base station 106-c is determined from any one of the all the second base stations 106-b for establishing the connection and communication services to the moving UE 104.

Figure 3:
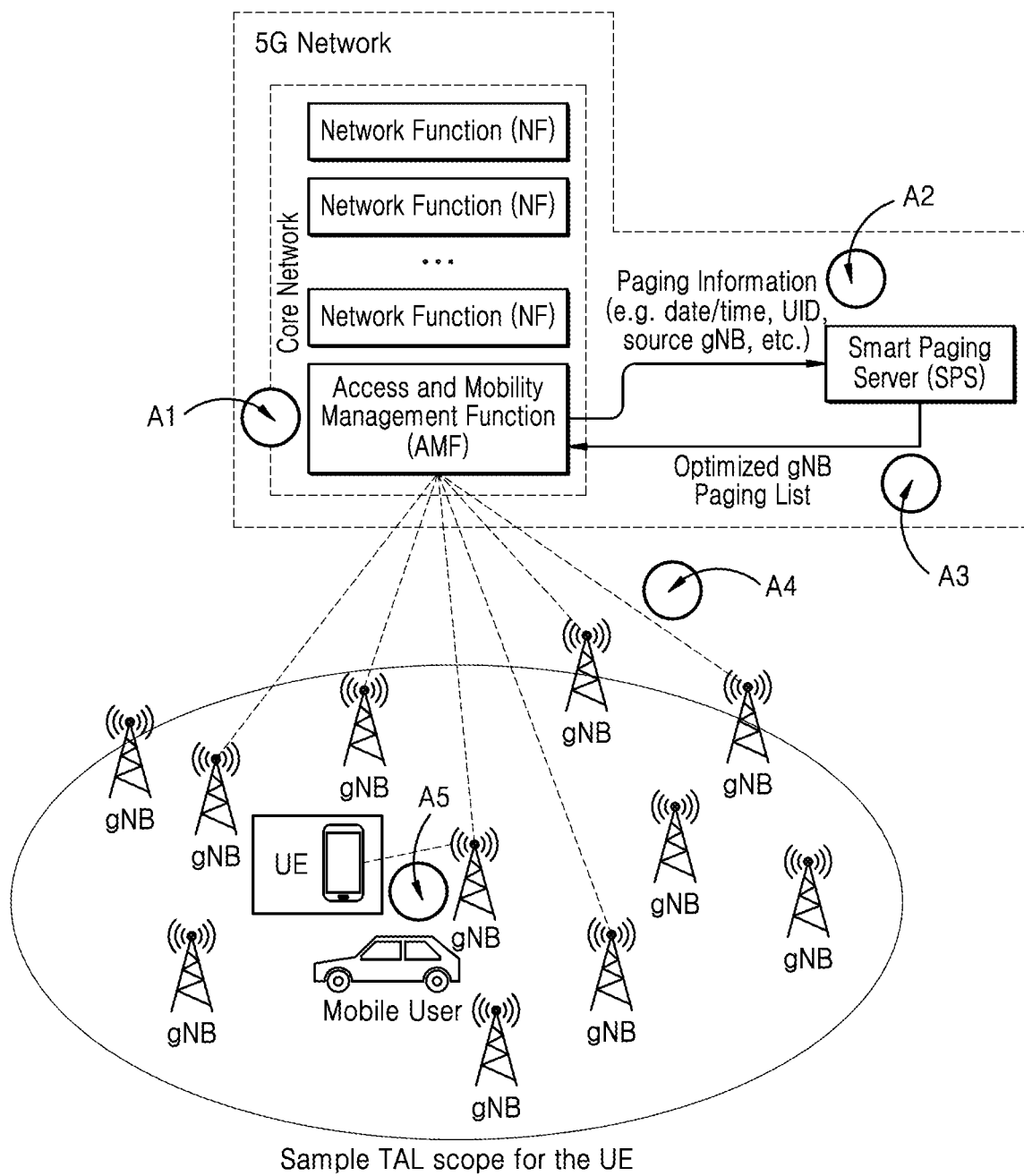
FIG. 3 is a diagram illustrating an example arrangement for providing mobility management with optimized paging system, according to various embodiments.

Referring now to FIG. 3, there is a diagram illustrating an example arrangement for providing mobility management with optimized paging system, according to various embodiments. Here, the core network node 102 is referred to as AMF (Access and Mobility Management Function) 102, and the paging server 110 is referred to as SPS 110. As illustrated in this example, non-limiting arrangement, the first part "A1" of the illustrated arrangement illustrates a paging event being triggered in the AMF 102. At the second part "A2," paging information 112 associated with the paging event are sent from the AMF 102 to the SPS 110. This paging information 112 may include, but not limited to, date/time, user ID (UID), and the source base station. The data associated with this paging information 112 are parsed in the SPS 110 and may be utilized, in an implementation, as features for the predicting the optimized or filtered list of base stations 106-b.

The resulting data from the parsed data at part "A3," e.g., the optimized or filtered list of base stations, are transmitted back to the AMF 102. These resulting data primarily include the subset of the second set of tracking areas which are determined based on the applications and/or executions of the mobility model 114 and the filtering and optimization processes 116. At part "A4" of the illustrated example arrangement in FIG. 3, the AMF 102 broadcasts to the base stations based on the list of the filtered base stations 106-*b* transmitted from the SPS 110.

As illustrated in the diagram of FIG. 3, the utilization of the mobility model 114 and the filtering and optimization processes 116 performable by and executing on the SPS 110 results in the minimization/reduction of the scope of the broadcast for transmitting paging message to the UE 104.

At part "A5" of the illustrated example arrangement in FIG. 3, the serving base station selected from the filtered list of base station is able to establish a connection to the moving UE 104 and is accordingly able to provide telecommunication services to the user of the UE 104. Alternatively, the SPS 110 may be provided with the capability to perform paging message optimization on older and/or future network generations. For example, as in the case of 4G network, an MME may communicate with the herein disclosed paging server or SPS 110.

The disclosed paging system is provided in three stages. The first stage is determining whether the destination base station is the same as the source base station, resulting in either first paging if they are the same or to subjecting the base stations belonging to the tracking area list where the UE is found to filtering if they are not the same. The second paging takes place if the destination base station is present in a list of predicted base stations that come as a result of the filtered base stations. The third paging may take place if the destination base stations is not present in the list of predicted base stations.

Figure 4:
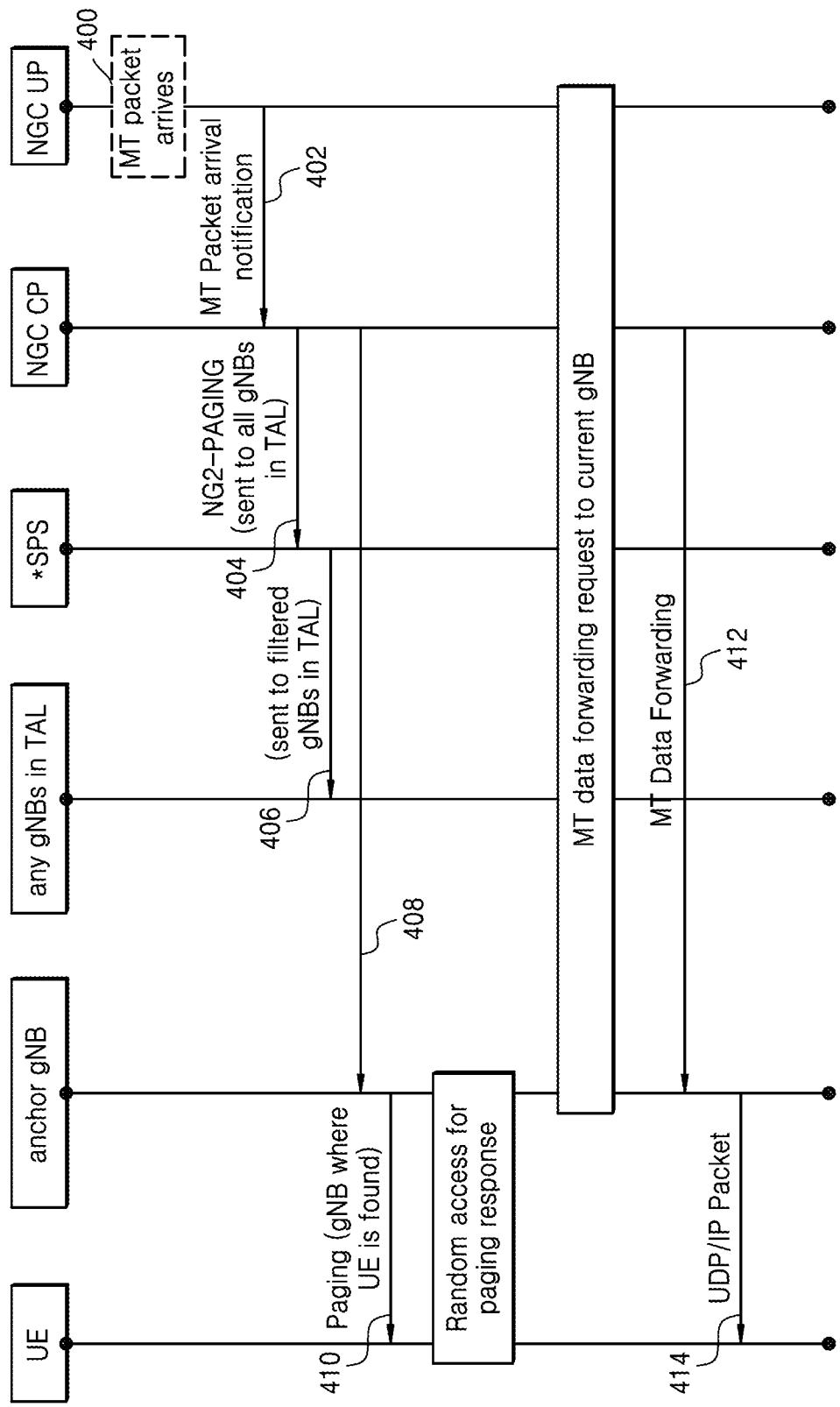
FIG. 4 is a signal flow diagram illustrating example interactions among example components according to various embodiments.

Referring now to FIG. 4, there is shown a signal flow diagram illustrating an example interaction among example components of the present disclosure, according to various embodiments. The illustrated interaction in FIG. 4 shows one possible example mode of operation among the herein disclosed UE 104, anchor gNB or base station, any gNBs or base stations in a tracking area list to which they belong, the paging server or SPS 110, the control plane of the CN node 102 which may be a Next Generation Core (NGC CP) as illustrated by way of example and for service-based interface, and the user plane of the CN node 102 (NGC UP) as illustrated by way of example and for policy control. More particularly, the illustrated interaction diagram shows a core network initiated paging procedure in a 5G network, consistent with the present disclosure.

The interaction may commence with the arrival of the Maximum-Time (MT) packets (Step 400) and, in which case, a notification for the MT packet arrival may be transmitted from the NGC UP to the NGC CP (Step 402). In turn, paging information in accordance with the arrival of the MT packet shared by the NGC UP with the SPS and also with the all the base stations or gNBs in the TAL (Step 404). Filtering at this point may be performed by the SPS in accordance with one or more implementations disclosed herein. Consequently, the filtered gNBs in the TAL may be sent from the SPS to any of the filtered gNBs in the TAL (Step 406).

While the paging information are being sent from the NGC UP to the SPS as disclosed at Step 404, or after such sending at the Step 404, communication between the NGC CP to the anchor gNB may be initiated for the transfer of the paging information as disclosed by way of example (Step 408). Consequently, the paging information may be transmitted from the NGC CP to the base station or gNB where the UE is found (Step 410) which may result in the establishment of random access for paging response between the anchor gNB and the UE and as well as of the MT data forwarding request to the current. According to one, non-limiting implementation, the MT data may be forwarded from the NGC UP to the anchor gNB (Step 412), and the UDP/IP packet dividing paging messages into packets may be transmitted from the anchor gNB to the UE (Step 414).

Figure 5:
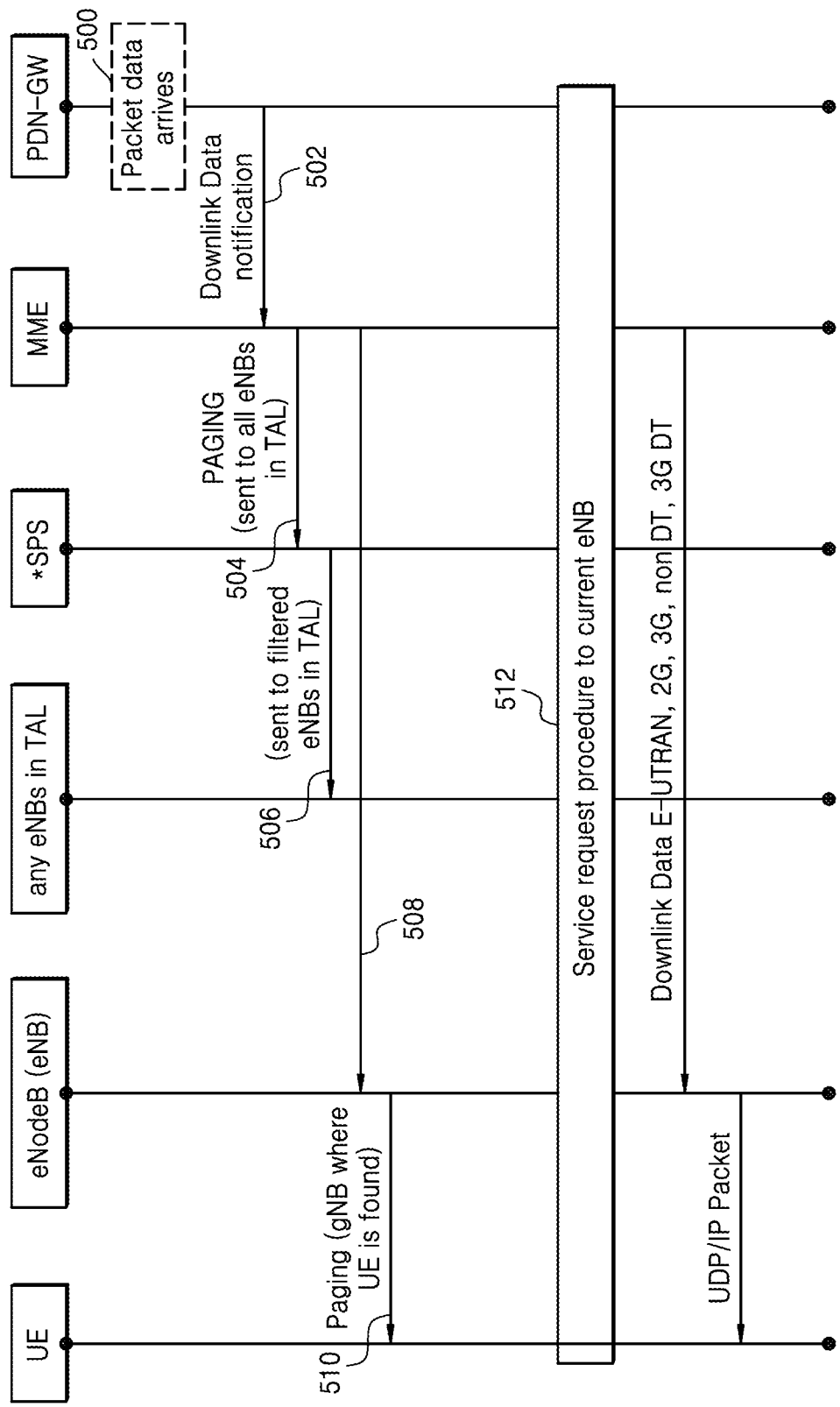
FIG. 5 is a signal flow diagram illustrating example interactions among further components according to various embodiments.

Referring now to FIG. 5, there is shown a signal flow diagram which illustrates an example interaction among example components according to various embodiments. The illustrated interaction in FIG. 5 particularly shows an example mode of operation for a core network initiated paging procedure in a 4G (LTE) network among the herein disclosed Packet Data Network Gateway (PDN GW), MME, SPS, any eNBs in TAL, serving eNodeB (eNB), and UE.

The interaction may commence with the arrival of the arrival of the packet data (Step 500) and, in which case, a downlink data notification for the packet data arrival may be transmitted from the PDN-GW to the MME (Step 502). In turn, the MME sends paging information to the SPS 110 in accordance with the arrival of the packet data and all eNBs in TAL (Step 504). The SPS 110 may then perform the filtering process which may result in the sending of the filtered eNBs in TAL from the SPS to any filtered eNBs in TAL (Step 506).

While the paging information are being sent from the MME to the SPS as disclosed at Step 504, or after such sending at the Step 504, communication between the MME to the eNodeB may be initiated for the transfer of the paging information (Step 508). Consequently, the paging information may be transmitted from the eNB to the base station or gNB where the UE 104 is found (Step 510) which may result in the establishment of service request procedure to the current eNB (Step 512). For every transmission of downlink data from the PDN-GW to the eNB, the UDP/IP packet may be transmitted from eNB to the UE 104.

Figure 6:
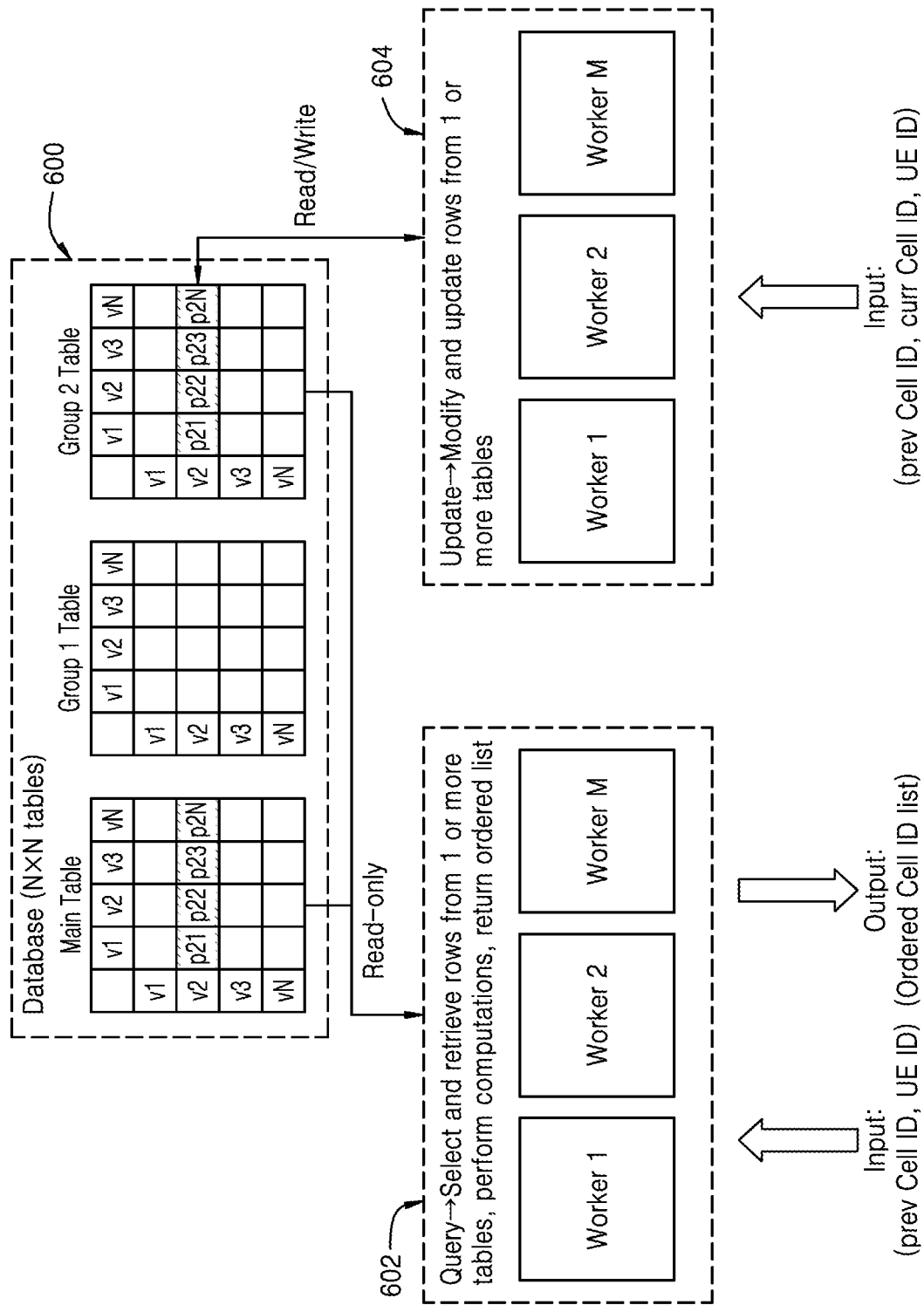
FIG. 6 is a block diagram illustrating an example database view of the three-stage paging optimization architecture according to various embodiments.

Referring to FIG. 6, there is shown a block diagram illustrating an example database view of a three-stage paging optimization architecture in accordance with various embodiments. The illustrated database view shows database tables 600 for all the values associated with computing resources of the present disclosure. The illustrated database view further shows query commands 602 and update commands 604 applied to various data stored in the database such as, but not limited to, previous cell ID, current cell ID, and UE ID.

Figure 7:
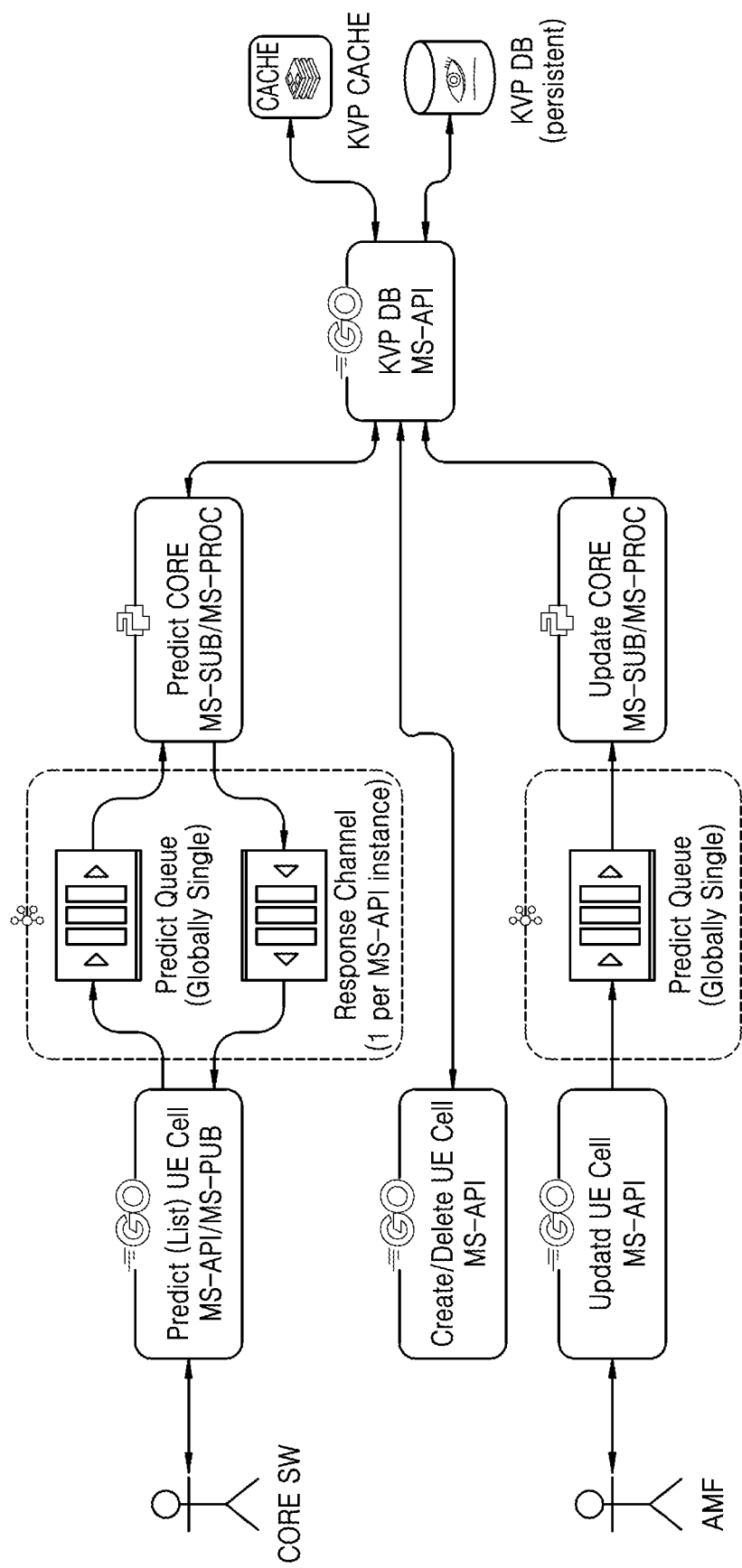
FIG. 7 is a block diagram illustrating an example microservice architecture deployment of the three-stage paging optimization according to various embodiments.

Referring to FIG. 7, there is shown a block diagram illustrating an example microservice architecture deployment of the herein disclosed three-stage paging optimization according to various embodiments. Through the example illustrated microservice architecture, the herein disclosed applications may be implemented as small parts, creating APIs for each of the herein disclosed components, wherein the APIs may be consumed by the applications independently of one another.

In essence, the transmissions of the herein disclosed first paging message, second paging message, and third paging message, consistent with one or more aspects and implementations of the present disclosure, are deployed using the herein disclosed microservice architecture. Accordingly, and consistent with one or more aspects and implementations of the present disclosure, the microservice architecture may have a microservice delivery pipeline that is configurable based on at least one pipeline generation template.

Figure 8:
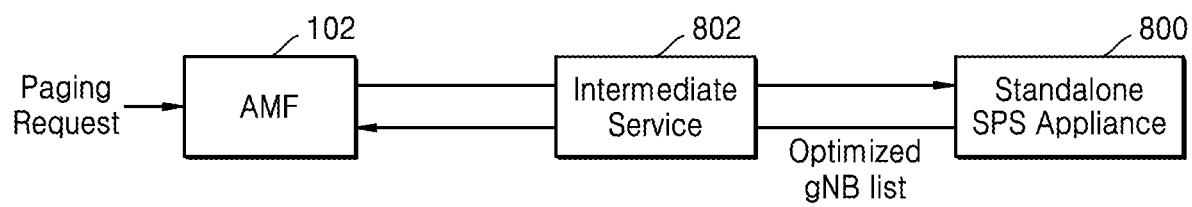
FIG. 8 is a flow diagram illustrating example communication flow between the core network node and an implementation according to various embodiments.

Referring to FIG. 8, there is shown a flow diagram illustrating example communication flow between the AMF/CN 102, or the core network node 102, according to various embodiments. Here, with more particularity, the implementation of the smart paging solution as provided by the SPS 110 may be in the form of a standalone appliance or the standalone SPS appliance 800. Alternatively, the implementation of the herein disclosed smart paging solution as provided by the SPS 110 may also be in the form of a virtual machine. In yet another alternative implementation, the implementation of the herein disclosed smart paging solution as provided by the SPS 110 may also be in the form of a container. The alternative implementations are discussed in greater detail in the ensuing disclosure, with reference to FIG. 9.

As standalone appliance, the SPS 110 may have the capability of receiving or transmitting wireless traffic. As virtual machine deployed in a network of computers, the SPS 110 may operate in the capacity of a server. Alternatively, the SPS 110 may operate in the capacity of a client user machine suitably arranged for deployment in server-client user network environment. It is to be understood or appreciated by a person have ordinary skills in the relevant art that such deployment may also come as a peer machine in a peer-to-peer network environment characterized by distributed computing resources. As container, the SPS 110 may be a container type suitably arranged to be used by a particular network service provider. In that case, only services supplied by an entity characterizing the network service provider can run in or executed on a particular SPS 110, rendering such services customizable and/or designatable by the entity or network service provider.

As shown in FIG. 8, paging request may be received by the AMF 102 which processes paging information with the intermediate service between the AMF 102 and the illustrated example standard SPS appliance 800. The paging information may contain information such as, but not limited to, UE ID, previous gNB, and the like. The illustrated example intermediate service or services 802 may facilitate communication between the AMF/CN 102 and the standalone SPS appliance 800, consistent with one or more aspects and implementations of the present disclosure.

The intermediate service 802 may come as optional since the appliance 800 may directly communicate with the AMF/CN 102, depending on desired network or system configuration. It is to be understood and appreciated that the standard SPS appliance 800 may communicate with the AMF/CN 102 through any network function that facilitates seamless communication or data exchange.

Accordingly, and consistent with one or more implementations of the present disclosure, the standalone SPS appliance 800 may be configured to receive the paging information and consequently return optimized gNB list, among others, back to the AMF or CN node 102. After the receiving such information, the AMF 102 proceeds with paging. In some implementations, the standalone SPS appliance 800 may also perform paging message optimization on a 4G (MME) network, or on other one or more past, present, or future generations of mobile networks as the case may be, and in accordance with the present disclosure.

Figure 9:
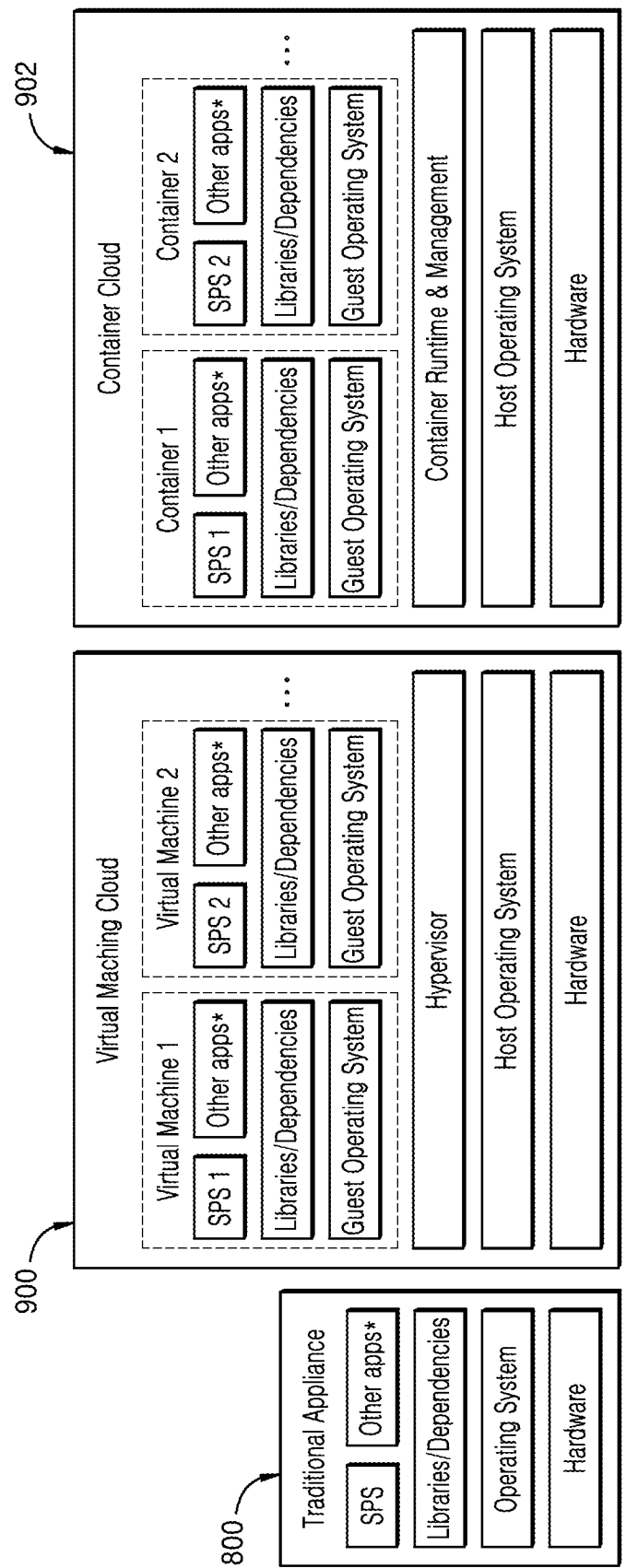
FIG. 9 is a block diagram illustrating an overview of implementations of the paging server according to various embodiments.

Referring to FIG. 9, there is shown a block diagram illustrating an example overview of the implementation variations in accordance with various embodiments. The diagram shows three main blocks, one for the traditional appliance 800, another for the virtual machine cloud 900, and finally for the container cloud 902.

The traditional appliance 800, as illustrated by way of example, and not by way of limitations, may include functionalities, both in hardware and/or software implementations, provided for by SPS 110, libraries/dependencies, operating system, hardware components, and other applications as the case may be, consistent with the present disclosure.

The virtual machine cloud 900, as illustrated by way of example, and not by way of limitations, may include functionalities, both in hardware and/or software implementations, for one or more virtual machines, hypervisor, host operating system, and hardware components. The virtual machine may also be preconfigured virtual appliance, consistent with one or more implementations of the present disclosure. In an implementation, and by way of non-limiting examples, each virtual machine may include functionalities provided for by SPS, libraries or dependencies, guest operating system, and other applications, as the case may be.

The container cloud 902, as illustrated by way of example, and not by way of limitations, may include functionalities, both in hardware and/or software implementations, for one or more containers, container runtime and management, host operating system, and hardware components. Each container may include functionalities provided for by SPS 110, libraries/dependencies, guest operating system, and other configurable applications, as the case may be.

While the illustrated deployment may be in form of a traditional appliance 800, virtual machine 900, and container 902, it is also possible to have a proper combination of at least two of the three deployment methods specified. In another implementation, such combination includes the three deployment methods specified, namely, the traditional appliance 800, the virtual machine 900, and the container 902. In some implementations, the applications within the deployment setup meanwhile may be optional; hence, the appliance may or may not contain these applications.

Figure 10:
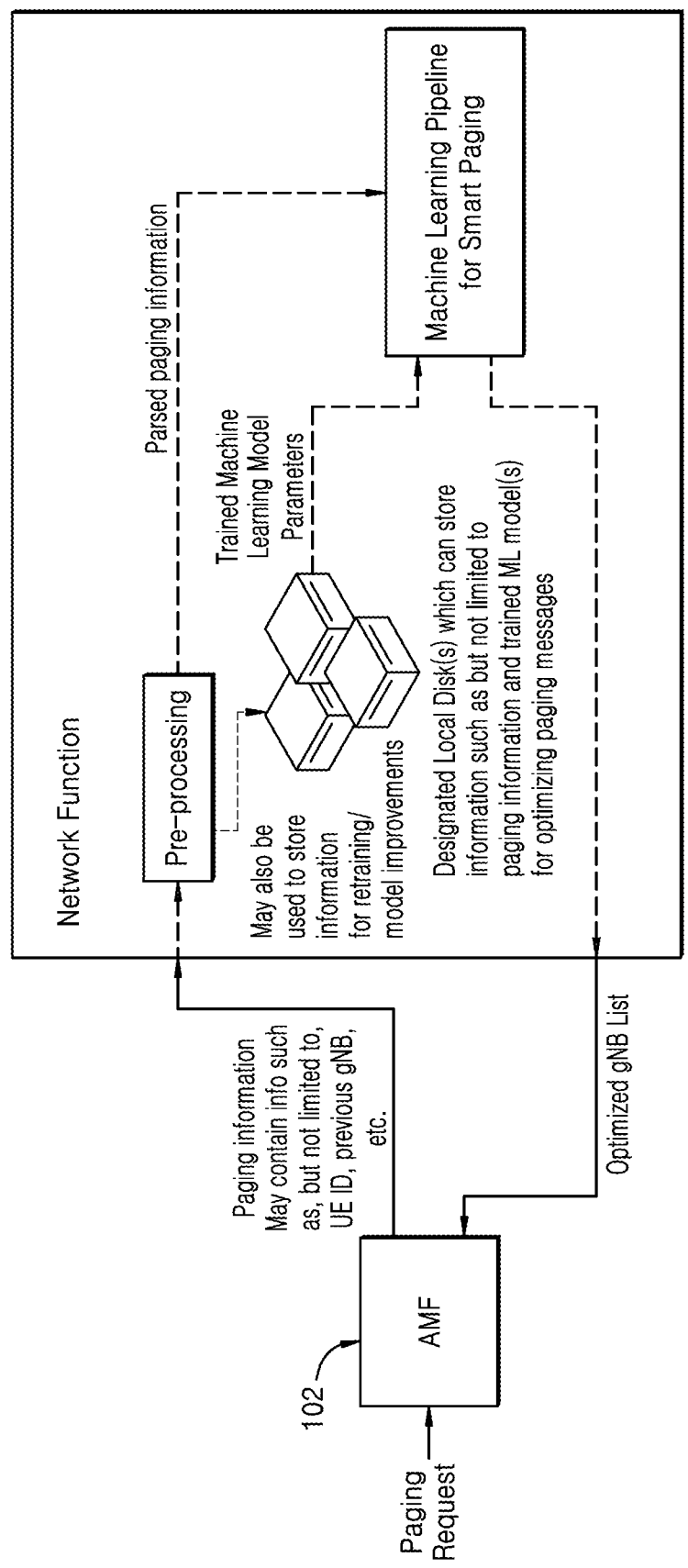
FIG. 10 is a block diagram illustrating an example implementation for a smart paging, according to various embodiments.

Referring now to FIG. 10, there is shown a block diagram illustrating an example implementation for a smart paging integrated within a NF of CN communicating with the CN node or AMF 102 according to various embodiments. For example, the diagram of FIG. 10 shows the communication between the AMF 102 and another NF that contains the machine learning pipeline for optimizing the paging messages. The AMF 102 may be arranged to send paging information to the NF upon receiving the paging request and the NF parses the data. The pre-processing step may also be integrated within the ML Pipeline and is also an optional step. The data may be sent to the ML Pipeline for Smart Paging along with the trained ML model parameters and sends primarily but not limited to the optimized gNB list back to the AMF 102. Additionally, the paging information from the AMF 102 may or may not be stored by the NF for training, retraining, or improving the ML model(s) within the system. This data, in accordance with one or more implementations of the disclosure, may be stored in designated local disks or within a separate data store in the cloud/data lake.

Figure 11:
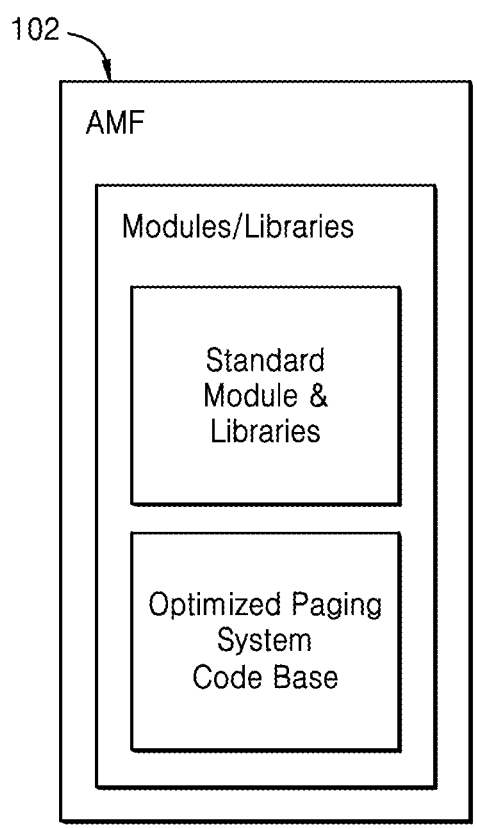
FIG. 11 is a block diagram illustrating an example implementation for a smart paging, according to various embodiments.

Referring to FIG. 11, there is shown a block diagram illustrating an example implementation for smart paging or optimized paging system code base that is integrated within the AMF 102 according to various embodiments. If the solution is within the AMF 102, the Optimized Paging System Code Base is integrated within the modules and libraries of the AMF. As illustrated, when a paging request is made, the prediction function(s) are called by the AMF 102 to retrieve the optimized paging list. After retrieving the optimized paging list, the AMF 102 may proceed with paging. In an implementation, and without limiting the scope of the present disclosure, the AMF 102 also has access to the data store.

In some implementations, such data store (which may be local or outside of the AMF 102) may primarily contain trained ML models. Accordingly, and consistent with one or more aspects and one or more implementations of the present disclosure, the AMF 102 may or may not be arranged or configured to save the paging information received to train, retrain, or improve one or more ML models. As illustrated by way of example, and without limitation, the AMF 102 may include modules/libraries containing standard module and libraries, and as well as optimized paging system code base.

Figure 12:
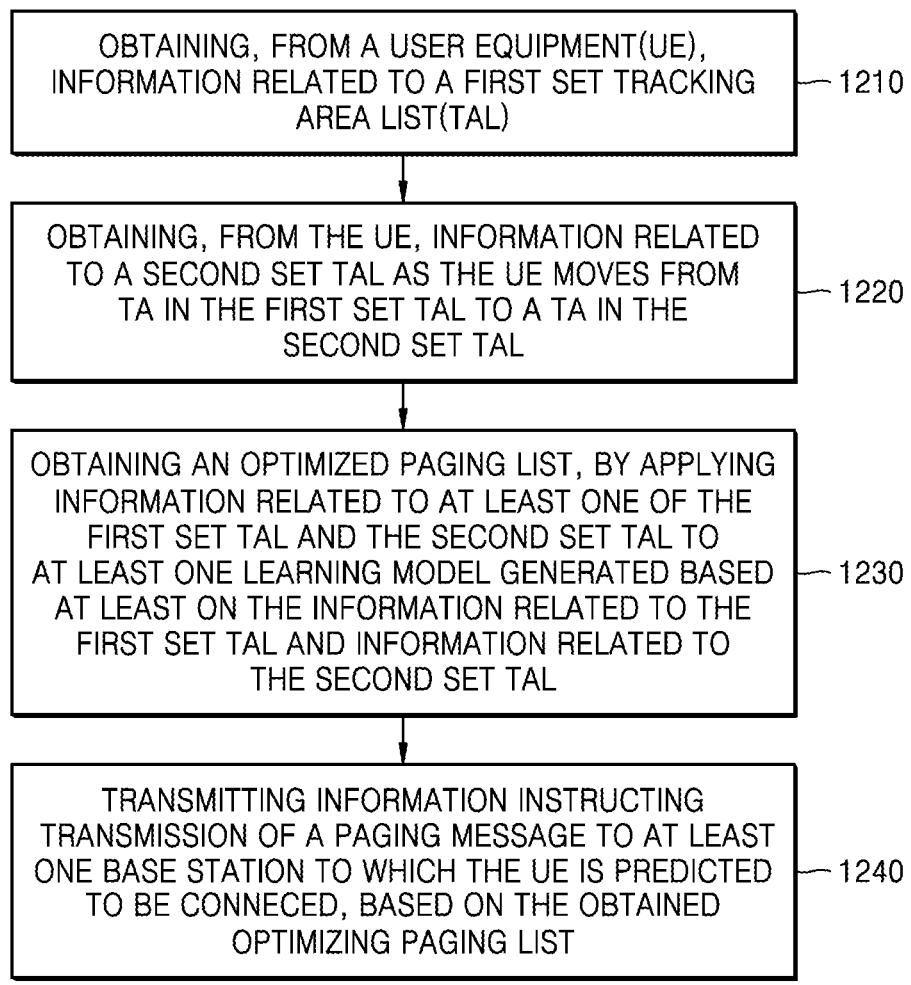
FIG. 12 is a flowchart illustrating an example implementation for AMF, according to various embodiments.

FIG. 12 is a flowchart illustrating an example operation of an AMF, according to various embodiments.

Referring to FIG. 12, there is shown a flowchart of a method of AMF for mobility management, in accordance with an embodiment. At step 1210, AMF obtains, from a UE, information related to a first set TAL. At step 1220, the AMF obtains, from the UE, information related to a second set TAL as the UE moves from TA in the first set TAL to a TA in the second set TAL. At step 1230, the AMF obtains an optimized paging list, by applying information related to at least one of the first set TAL and the second set TAL to at least one learning model generated based at least on the information related to the first set TAL and information related to the second set TAL. After obtaining the optimized paging list, at step 1240, the AMF transmits information instructing transmission of a paging message to at least one base station to which the UE is predicted to be connected, based on the obtained optimizing paging list.

Figure 13:
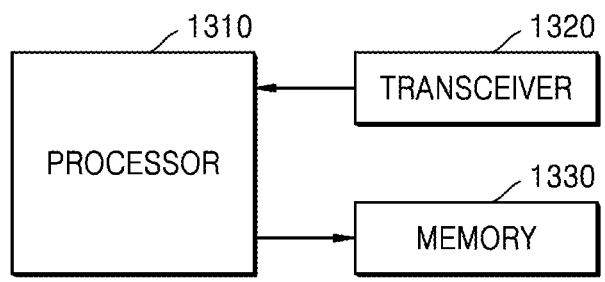
FIG. 13 is a block diagram illustrating an example configuration of a network entity, according to various embodiments.

FIG. 13 is a block diagram illustrating an example configuration of a network entity, according to various embodiments.

Referring to FIG. 13, the network entity may include a transceiver 1320, a memory 1330, and a processor (e.g., including processing circuitry) 1310. The transceiver 1320, the memory 1330, and the processor 1310 of the network entity may operate according to the communication method of the network entity described above. However, components of the network entity are not limited thereto. For example, the network entity may include more or less components than those shown in FIG. 13. In addition, the transceiver 1320, the memory 1330, and the processor 1310 may be embodied in the form of a single chip. According to an embodiment, the network entity may include entities included in a base station and a core network. The network entity may include the NF described above, and for example, may include an AMF, an SMF, and the like.

The transceiver 1320 may transmit and receive a signal to and from a UE, a network entity, or a base station. Here, the signal may include control information and data. In this regard, the transceiver 1320 may include an RF transmitter up-converting and amplifying a frequency of a transmitted signal and an RF receiver performing low-noise amplification on a received signal and down-converting a frequency. However, such components of the transceiver 1320 are only examples, and are not limited to the RF transmitter and the RF receiver.

Also, the transceiver 1320 may receive a signal via a wireless channel and output the signal to the processor 1310, and transmit a signal output from the processor 1310 via the wireless channel.

The memory 1330 may store a program and data required for an operation of the network entity. Also, the memory 1330 may store control information or data included in a signal obtained by the network entity. The memory 1330 may include a storage medium, such as read-only memory (ROM), random-access memory (RAM), a hard disk, a CD-ROM, or a DVD, or *a* combination thereof. Also, the memory 1330 may include a plurality of memories. According to an embodiment of the disclosure, the memory 1330 may store a program for supporting beam-based cooperative communication.

The processor 1310 may include various processing circuitry and control a series of processes such that the network entity operates according to the embodiment of the disclosure. For example, the processor 1310 may configured to execute the at least one or more instructions stored in memory to perform obtaining, from the UE, information related to a first set TAL, obtaining, from the UE, information related to a second set TAL, as the UE moves from a TA in the first set TAL to a TA in the second set TAL, obtaining an optimized paging list by applying information related to at least one of the first set TAL and the second set TAL to at least one learning model generated based at least on the information related to the first set TAL and information related to the second set TAL and transmitting information instructing transmission of a paging message to at least one base station to which the UE is predicted to be connected based on the obtained optimized paging list, wherein the first set TAL includes a TA in which the UE is located before the UE transitions to an idle state. The processor 1310 may perform only some operations of the embodiments of the disclosure, but alternatively, may control all processes such that the network entity may operate according to all or some of the embodiments of the disclosure.

Figure 14:
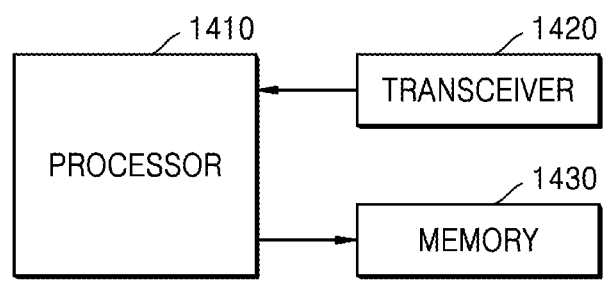
FIG. 14 is a block diagram illustrating an example configuration of a UE, according to various embodiments.

FIG. 14 is a block diagram illustrating an example configuration of a UE, according to various embodiments.

Referring to FIG. 14, the UE may include a transceiver 1420, a memory 1430, and a processor (e.g., including processing circuitry) 1410. The transceiver 1420, the memory 1430, and the processor 1410 of the UE may operate according to the communication method of the UE described above. However, components of the UE are not limited thereto. For example, the UE may include more or less components than those shown in FIG. 14. In addition, the transceiver 1420, the memory 1430, and the processor 1410 may be embodied in the form of a single chip.

The transceiver 1420 may transmit and receive a signal to and from a base station. Here, the signal may include control information and data. In this regard, the transceiver 1420 may include a radio frequency (RF) transmitter up-converting and amplifying a frequency of a transmitted signal and an RF receiver performing low-noise amplification on a received signal and down-converting a frequency. However, such components of the transceiver 1420 are only examples, and are not limited to the RF transmitter and the RF receiver.

Also, the transceiver 1420 may receive a signal via a wireless channel and output the signal to the processor 1410, and transmit a signal output from the processor 1410 via the wireless channel.

The memory 1430 may store a program and data required for an operation of the UE. Also, the memory 1430 may store control information or data included in a signal obtained by the UE. The memory 1430 may include a storage medium, such as read-only memory (ROM), random-access memory (RAM), a hard disk, a CD-ROM, or a DVD, or a combination thereof. Also, the memory 1430 may include a plurality of memories. According to an embodiment of the disclosure, the memory 1430 may store a program for mobility management according to embodiments of the present disclosure.

The processor 1410 may include various processing circuitry and control a series of processes such that the UE operates according to the embodiment of the disclosure. For example, the processor 1410 may control the transceiver 1420 and the memory 1430 to perform mobility management according to embodiments of the present disclosure. Here, in relation to operations of the processor 1410, only some of the operations of the embodiments of the disclosure have been described, but the processor 1410 may control all processes such that the UE may operate according to all or some of the embodiments of the disclosure.

The herein provision of three-stage paging implemented with one or more mobility models and one or more filtering and optimization algorithm ensures that the overhead paging traffic consumed is reduced, which in turn increases network capacity and promotes efficient use of network resources ultimately leading to lower costs.

Although the example embodiments and/or implementations have been described in detail above, it should be understood that various changes, substitutions, and alterations can be made herein without departing from the scope of the present disclosure. For example, although the present disclosure has been described and illustrated primarily in relation to data networks, it should be understood that the present disclosure is in no way limited to such data networks and may alternatively be implemented on other types of networks. It should be understood that the application of the present disclosure is not limited only to fundraiser campaigns. Rather, the present disclosure may be suitably implemented to perform all forms of financial and other transactions over a data communications network that will be apparent to those skilled in the art. For example, the present disclosure may be used as a marketing tool to sell products or services for profit driven organizations or business entities. Furthermore, it should be noted that the present disclosure can be implemented using virtually any computer system or other networking system and virtually any available programming language. Thus, the implementations of the present disclosure are not limited to the computing environment illustrated in this disclosure. Put differently, other examples of changes, substitutions, and alterations are readily ascertainable by one skilled in the art and could be made without departing from the spirit and scope of the present disclosure including the following claims as appended to this disclosure.

Various example embodiments are described below.

In an embodiment, the at least one learning model is trained based at least on the first set TAL, the second set TAL, and information related thereto and the at least one learning model outputs the optimization paging list.

In an embodiment, the method compares an output value of the at least one learning model corresponding to the first set TAL or the second set TAL with information related to the first set TAL or information related to the second set TAL and repeats the step of training the at least one learning model based on the comparison result value.

In an embodiment, when the output value of the at least one learning model corresponding to the first set TAL or the second set TAL is different from the information related to the first set TAL or the information related to the second set TAL, the method repeats the step of training the at least one learning model.

In an embodiment, when the output value of the at least one learning model corresponding to the first set TAL or the second set TAL is the same as the information related to the first set TAL or the information related to the second set TAL, the method stops the step of training the at least one learning model.

In an embodiment, the method repeats the training of the at least one learning model a specified number of times In an embodiment, the AMF trains the at least one learning model based at least on the first set TAL, the second set TAL, and information related thereto and the at least one learning model outputs the optimization paging list.

In an embodiment, the AMF compares the output value of the at least one learning model corresponding to the first set TAL or the second set TAL with the information related to the first set TAL or the information related to the second set TAL, and repeatedly performs training of the at least one learning model based on the comparison result value.

In an embodiment, when the output value of the at least one learning model corresponding to the first set TAL or the second set TAL is different for the information related to the first set TAL or the information related to the second set TAL, the AMF repeatedly performs the training of the at least one learning model.

In an embodiment, when the output value of the at least one learning model corresponding to the first set TAL or the second set TAL is the same as the information related to the first set TAL or the information related to the second set TAL, the AMF stops training of the at least one learning model.

In an embodiment, the AMF repeatedly performs the training of the at least one learning model a specified number of times.

In an embodiment, the optimized paging list is obtained from a device or pipeline independent of the AMF.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed, by access and mobility management function (AMF), in a wireless communication system, for mobility management, the method comprising;
    obtaining, from a user equipment (UE), information related to a first set of tracking area list (TAL);
    obtaining, from the UE, information related to a second set of TAL based on the UE moving from a first tracking area (TA) in the first set of TAL to a second TA in the second set of TAL;
    obtaining an optimized paging list, by applying the information related to at least one of the first set of TAL and the second set of TAL to at least one learning model generated based at least on the information related to the first set of TAL and information related to the second set of TAL; and
    transmitting information indicating transmission of a paging message to at least one base station to which the UE is predicted to be connected, based on the obtained optimizing paging list;
    wherein the first set of TAL includes a TA in which the UE is located before the UE transitions to idle state, and
    wherein the optimized paging list comprises an output of the at least one learning model.

2. The method of claim 1,
the obtaining the optimized paging list comprises,
training the at least one learning model based at least on the first set of TAL, the second set of TAL, and the information related to the first set of TAL and the second set of TAL.

3. The method of claim 2, wherein:
the obtaining the optimized paging list comprises:
determining whether an output value of the at least one learning model corresponding to the first set of TAL and the second set of TAL is the same as the information related to the first set of TAL and the second set of TAL; and
determining whether to repeatedly perform the training of the at least one learning model based on the determination.

4. The method of claim 3, wherein:
based on the output value of the at least one learning model corresponding to the first set of TAL and the second set of TAL being different from the information related to the first set of TAL and the second set of TAL, repeating the training of the at least one learning model.

5. The method of claim 3, wherein:
based on the output value of the at least one learning model corresponding to the first set of TAL and the second set of TAL being the same as the information related to the first set of TAL and the second set of TAL, stopping the training of the at least one learning model.

6. The method of claim 2, further comprising:
repeating the training of the at least one learning model a specified number of times.

7. The method of claim 1,
wherein the optimized paging list is obtained from a device or pipeline independent of the AMF.

8. An Access and Mobility management Function (AMF) entity for mobility management comprising:
a memory configured to store one or more instructions; and
at least one processor, comprising processing circuitry, configured to execute the one or more instructions stored in the memory to:
obtain, from a user equipment (UE), information related to a first set of tracking area list (TAL);
obtain, from the UE, information related to a second set of TAL based on the UE moving from a first tracking area (TA) in the first set of TAL to a second TA in the second set of TAL;
obtain an optimized paging list, by applying the information related to at least one of the first set of TAL and the second set of TAL to at least one learning model generated based at least on the information related to the first set of TAL and information related to the second set of TAL; and
transmit information indicating transmission of a paging message to at least one base station to which the UE is predicted to be connected, based on the obtained optimizing paging list;
wherein the first set of TAL includes a TA in which the UE is located before the UE transitions to idle state, and
wherein the optimized paging list comprises an output of the at least one learning model.

9. The AMF entity of claim 8, wherein the processor is further configured to:
train the at least one learning model based at least on the first set of TAL, the second set of TAL, and the information related to the first set of TAL and the second set of TAL.

10. The AMF entity of claim 9, wherein the processor is further configured to:
determine whether an output value of the at least one learning model corresponding to the first set of TAL and the second set of TAL is the same as the information related to the first set of TAL and the second set of TAL; and
determine whether to repeatedly perform training of the at least one learning model based on the determination.

11. The AMF entity of claim 10, wherein the processor is configured to:
based on the output value of the at least one learning model corresponding to the first set of TAL and the second set of TAL being different from the information related to the first set of TAL and the second set of TAL, repeatedly perform the training of the at least one learning model.

12. The AMF entity of claim 10, wherein the processor is configured to:
based on the output value of the at least one learning model corresponding to the first set of TAL and the second set of TAL being the same as the information related to the first set of TAL and the second set of TAL, stop the training of the at least one learning model.

13. The AMF entity of claim 9, wherein the processor is configured to:
repeatedly perform the training of the at least one learning model a specified number of times.

14. The AMF entity of claim 8, wherein:
the optimized paging list is obtained from a device or pipeline independent of the AMF.

15. One or more computer-readable recording medium having stored thereon one or more instructions which, when executed, cause on or more processors to perform the operations of claim 1.

* * * * *